No. 653,380. Patented July 10, 1900.
W. N. L. DAVIDSON.
CAMERA FOR COLOR PHOTOGRAPHY.
(Application filed Sept. 11, 1899.)

(No Model.)

Witnesses
William James Cox.
Frank William Pattison

Inventor
William Norman Lascelles Davidson
By his Attorney,
Geo. H. Rayner.

UNITED STATES PATENT OFFICE.

WILLIAM NORMAN LASCELLES DAVIDSON, OF SOUTHWICK, ENGLAND.

CAMERA FOR COLOR PHOTOGRAPHY.

SPECIFICATION forming part of Letters Patent No. 653,380, dated July 10, 1900.

Application filed September 11, 1899. Serial No. 730,142. (No model.)

*To all whom it may concern:*

Be it known that I, WILLIAM NORMAN LAS-CELLES DAVIDSON, a subject of the Queen of Great Britain and Ireland, residing at Rose Cottage, Southview road, Southwick, county of Sussex, England, have invented certain new and useful Improvements in Color Photography, of which the following is a specification.
This invention relates to means for taking photographs in natural colors by what is known as the "three-color" process; and it consists, essentially, in the construction and mechanism of the camera employed, whereby greater efficiency is obtained.

This invention consists, essentially, in an arrangement whereby three photographs can be taken either at once or immediately after one another, the said photographs having the required color proportions for three-color photography.

When used for paintings and such like work, the three lenses can be exposed at once, while when employed for other work the camera is shifted so that the three lenses are all exposed from exactly the same position. The mechanism to be hereinafter described effects the movement of the camera after each exposure has been made and can be used with or without time exposure. The lenses are each supplied with a different-color-filtering screen in order to obtain negatives of the relative values of the colors filtering by the aid of the lenses and screens. These lenses may either be rectilinear or single landscape-lenses; but for advanced work and badly-lighted subjects rectilinear lenses are preferably employed. The color-filtering screens—light red, blue-violet, and green or yellow, respectively—are preferably of optical ground glass, but may be of dyed celluloid or other transparent material. Each lens has a different-sized aperture, the lens with the red screen having the largest, that with the blue-violet screen the smallest, and that with the green or yellow screen a medium stop.

In order that this invention may be more clearly described, reference is had to the accompanying sheet of illustrative drawings, on which—

Figure 1:
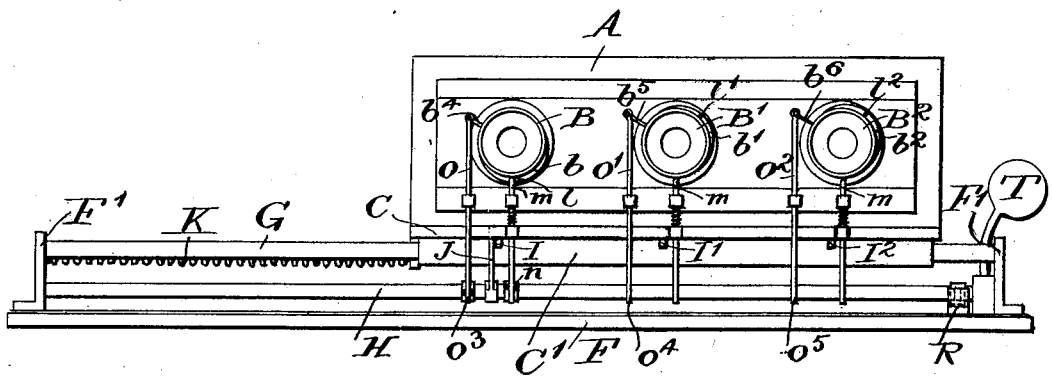
Figure 2:
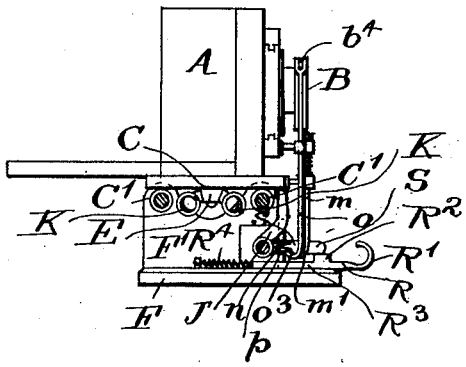

Figure 1 is a front elevation showing a camera constructed according to this invention, and Fig. 2 is an end view of the same, partly in section.

The camera A is provided with the three lens-openings B B' B² and is divided, internally, into three compartments by partitions between the lenses, so that three similar negatives can be obtained either on one long plate or on three separate plates fitted one behind each lens. The lenses B B' B² are provided with the requisite color-screens, as above described, and by means of stops the aperture in each case is regulated to give the required proportion according to the color to which each lens applies. The color-screens may be slipped in suitable holders at the back of the lenses or they may be passed between the combination in the case of rectilinear lenses or in front or behind the lens in the case of a single lens. The actual arrangement employed is not material to this invention, as the various arrangements indicated are well known.

The camera A is fitted upon a sliding carriage C, attached by means of thumb-screws E or the like. The base-board F is provided with standards F'' F' at each end, supporting rods G G. Tubes C' C' on the sliding carriage C are adapted to slide upon the rods G G.

Lengthwise of the base-board F a rod H is arranged, supported in suitable bearings and operated, by means of a rubber press-ball T, to cause a vibration through a small angle. Three catches I I' I² are arranged upon the under side of the carriage C, and a side rod J is arranged upon the rod B in such position that, the camera A being moved, it will be stopped at three different positions by means of the engagement of said rod J with one or other of the catches I I' I² at the positions necessary to bring each of the lenses B B' B² in turn into the proper position for exposure. Spiral springs K, attached at one end to one of the standards F' and at their other ends to the sliding carriage C, cause the movement of the camera along from one position to another as permitted by the rod J, as will be hereinafter more fully described.

The lenses B B' B² are provided with the shutters b b' b², having an aperture which as it passes before each lens will give the necessary exposure. Springs in each case serve to cause the movement of each shutter as soon as released. The catches $b^4$ $b^5$ $b^6$ serve to release each shutter when pressed in a manner well known. Each of the shutters $b$ $b'$ $b^2$ is provided with a pin $l$ $l'$ $l^2$, and in order to stop each shutter at the exposing position to allow for time exposure spring-rods $m$ are mounted in suitable brackets, so that their ends will come in the path of the pins $l$ $l'$ $l^2$ and will stop the shutters at the exposing position. The lower ends of the spring-rods $m$ are provided with extensions $m'$, upon which a projection $n$ upon the rod H can press. The rods $o$ $o'$ $o^2$ are connected to the shutter-catches $b^4$ $b^5$ $b^6$, and side projections $o^3$ $o^4$ $o^5$ are provided, upon which another projection $p$ upon the rod R can press. At the position which each lens B B' $B^2$ has to take for exposure a sliding piece R is mounted, having a finger-piece R'. At its other end it is cut away slightly, so that the portion $R^2$ is at a lower level than the portion $R^3$. A spring $R^4$ serves to return it to its proper position after each operation. A projection S on the rod H is adapted to bear normally on the higher portion $R^3$, but when the sliding piece R is moved outwardly will move through a further angle until it bears upon the lower portion $R^2$.

In order to describe the operation of this camera, I will describe the operations necessary for taking a photograph. The lenses B B' $B^2$ having been properly focussed and the plates inserted, the press-ball T is pressed, and the rod H is thereby vibrated through a certain angle until the rod S comes in contact with the higher portion $R^3$ of the sliding piece R. The projection $p$ will during this movement press upon the side projection $o^3$ of the rod $o$ and will thereby release the shutter-catch of the lens B, so that the shutter $b$ is allowed to move to expose the plate until stopped by the end of the spring-rod $m$. The necessary exposure being given, the sliding piece R is moved and the press-ball again pressed. The rod S can then pass onto the lower portion $R^2$, thus permitting of a further vibration of the rod R, and the projection $p$ then presses upon the side projection $m'$ of the spring-rod, so as to depress the latter to allow of the shutter $b$ completing its movement. At the same time the projection J is disengaged from the catch I and the camera A shifts bodily until the lens B' assumes the position previously occupied by the lens B. The operations are then similar for the lens B', first for moving the shutter $b'$ to the exposure position and then completing its movement and shifting the camera to the third exposure position.

When using the camera for copying paintings and the like, it is sufficient to expose all lenses at once, so that three distinct images are obtained, having each its correct proportion of color, by operating the shutter mechanism in the ordinary way. For other work, however, the three images thus obtained would not be exactly identical, and it is therefore necessary that all time exposures be made from exactly the same position.

The necessary movement of the camera can be very quickly effected, so that several exposures can be taken in very quick succession. If time exposure is not required, the mechanism can be simplified, so that on each pressure of the air-ball the proper shutter is operated without need for any mechanism for completing the movement as above described. At the same time the mechanism would move the camera from one position to the other.

What I claim as my invention, and desire to secure by Letters Patent, is—

1. In means for taking photographs according to the three-color process, a camera having three divisions each provided with a lens having its proper color-screen and with shutter mechanism, a sliding carriage carrying said camera, springs tending to draw the camera toward one end of the stand, and mechanism whereby the lenses can be exposed in turn and between each exposure the camera moved so that all three exposures are made at the same position, substantially as set forth.

2. In means for taking photographs according to the three-color process, a camera having three divisions each provided with a lens having its proper color-screen, and with shutter mechanism, a sliding carriage carrying said camera, a base-board having guides for said carriage, springs whereby the camera is moved from one end of the base-board to the other when its movement is permitted, a rod extending along said base-board and provided with air-ball or other mechanism whereby it can be vibrated through a small angle, and means whereby such vibration will cause the operation of each shutter as it is brought to the position from which the exposure is made and whereby the camera is moved to bring each of the lenses into position for exposure in turn, substantially as set forth.

3. In means for taking photographs according to the three-color process, a camera having three divisions each provided with a lens having its proper color-screen, and with shutter mechanism, a sliding carriage carrying said camera, a base-board having guides for said carriages, springs whereby the camera is moved from one end of the base-board to the other when its movement is permitted, a rod extending along said base-board and provided with air-ball or other mechanism whereby it can be varied through a small angle, a projection upon said rod which causes the shutter of the lens when it is in position for exposure to move to the exposing position, a sliding piece whereby on further operation of the air-ball a further vibration of the rod is permitted, a projection which will then release the shutter thus allowing it to close again, and a projection which is disengaged from a catch on the camera so as to permit the camera to move under the influence of the springs to bring the next lens into position for exposure, said projection then stopping it at that position, substantially as set forth.

4. In means for taking photographs according to the three-color process, a camera having three divisions each provided with a lens having its proper color-screen and with shutter mechanism, a sliding carriage carrying said camera, a base-board having guides for said carriage, springs whereby the camera is moved from one end of the base-board to the other when its movement is permitted, a rod extending along said base-board and provided with air-ball or other mechanism whereby it can be vibrated through a small angle, a projection upon said rod which causes the shutter of the lens which is in position for exposure to move to the exposing position, a spring-rod which stops each shutter at that position to allow for time exposure, a sliding portion by which a further vibration of the rod is permitted when the air-ball is again operated, a projection which releases the spring-rod on such further vibration to permit the shutter to close and a projection which is disengaged from a catch on the camera so as to permit the camera to move under the influence of its springs to bring the next lens into position for exposure, said projection stopping it at that position substantially as set forth.

In witness whereof I have hereunto set my hand in the presence of two witnesses.

WILLIAM NORMAN LASCELLES DAVIDSON.

In presence of—
P. G. DUDMAN,
ERNEST H. KEMPE.